United States Patent Office 3,526,640
Patented Sept. 1, 1970

1

3,526,640
3 - ACYLOXY - 4 - HALO - TETRAHYDROTHIO-
PHENE - 1,1 - DIOXIDES AND 3-ACYLOXY-
2(H)-THIOPHENE-1,1-DIOXIDES
George G. King, Guilford, and Andrew J. Esposito, New
Haven, Conn., assignors, by mesne assignments, to The
Ansul Company, a corporation of Wisconsin
No Drawing. Filed Apr. 16, 1968, Ser. No. 721,628
Int. Cl. A01n 9/14; C07d 63/04, 63/08
U.S. Cl. 260—332.1                    9 Claims

ABSTRACT OF THE DISCLOSURE

A series of 3-acyloxy-4-halo-tetrahydrothiophene-1,1-
dioxides have the formula

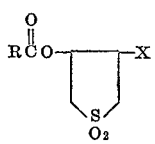

and a series of 3-acyloxy-2(H)-thiophene-1,1-dioxides
having the formula

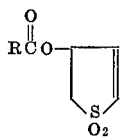

wherein X is halogen and R is aryloxyalkyl, haloaryloxy-
alkyl, loweralkyl substituted aryloxyalkyl, loweralkyl sub-
stituted haloaryloxyalkyl or nitroaryloxyalkyl are pro-
vided by reacting a 3-halo-4-hydroxysulfolane with an ap-
propriate acyl halide. These compounds are particularly
valuable as herbicides.

---

This invention relates to a series of 3-acyloxy-4-halo-
tetrahydrothiophene-1,1-dioxides having the formla

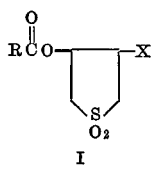

wherein X is halogen, i.e., fluorine, chlorine, bromine
or iodine, and R is aryloxyalkyl, haloaryloxyalkyl, lower-
alkyl substituted aryloxyalkyl, loweralkyl substituted
haloaryloxyalkyl or nitroaryloxyalkyl. This invention also
relates to a series of 3-acyloxy-2(H)-thiophene-1,1- di-
oxides having the formula

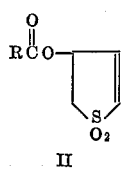

wherein R is a previously described.

Various substituted acyloxyhalotetrahydrothiophene-1,
1-dioxides and acyloxy-2(H)-thiophene-1,1-dioxides have
been previously prepared and reported in the literature.
Thus, N. J. Baker et al. in Rec. Trav. Chim., 61, 785
(1942) disclose the preparation of 3-acetyloxy-4-bromo-
tetrahydrothiophene-1,1-dioxide while 3-benzoyloxy-4-
chlorotetrahydrothiophene-1,1-dioxide is described in
U.S. Pat. 2,460,233. The preparation of various acyloxy-
2(H)-thiophene-1,1-dioxides is discussed in U.S. Pat.
2,610,192 which discloses the compound 3-acetyloxy-
2(H)-thiophene-1,1-dioxide.

2

Now it has been found that a series of selectively sub-
stituted hydrothiophene-1,1-dioxides I and II exhibiting
valuable herbicidal activity can be readily prepared ac-
cording to the teaching of this invention.

More in detail, the 3-acyloxy-4-halo-tetrahydrothio-
phene-1,1-dioxides I and 3-acyloxy-2(H)-thiophene-1,1-
dioxides II are provided by reacting a 3-halo-4-hydroxy-
sulfolane with an acyl halide in accordance with the
following general equation wherein R is as previously de-
scribed.

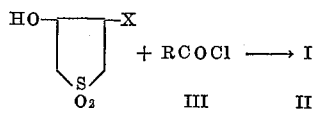

Illustrative acyl halides suitable for use in the prepara-
tion of the compounds of this invention include those
acyl halides III wherein R is phenoxyalkyl, halophenoxy-
alkyl, loweralkyl substituted phenoxyalkyl, loweralkyl
substituted halophenoxyalkyl or nitrophenoxyalkyl. By
the term "loweralkyl" in the claims and specification here-
in is meant an alkyl moiety having 1–5 carbon atoms.

Suitable acyl halides include phenoxyacetyl chloride,
phenoxypropionyl chloride, phenoxybutyryl chloride,
phenoxyvaleryl chloride, 2-chlorophenoxyacetyl chloride,
2,4 - dibromophenoxyacetyl chloride, 2-chloro-4-bromo-
phenoxyacetyl chloride, 3-chlorophenoxyacetyl chloride,
4-chlorophenoxyacetyl chloride, 2,4-dichlorochlorophen-
oxyacetyl chloride, 3,4-dichlorophenoxyacetyl chloride,
2,6-dichlorophenoxyacetyl chloride, 2,4,5-trichlorophen-
oxyacetyl chloride, 2-chlorophenoxybutyryl chloride, 2,
4-dichlorophenoxyvaleryl chloride, 2 - methylphenoxy-
acetyl chloride, 2-n-butylphenoxyacetyl chloride, 2-meth-
yl-4-isopropylphenoxyacetyl chloride, 4-t-butylphenoxy-
acetyl chloride, 4-ethylphenoxyacetyl chloride, 2,4-diiso-
propylphenoxyacetyl chloride, 2,4-dimethylphenoxyacetyl
chloride, 2-methylphenoxypropionyl chloride, 2-methyl-
4-isopropylvaleryl chloride, p-nitrophenoxyacetyl chlo-
ride, 2,4,5-trinitrophenoxyacetyl chloride, 2-chloro-4-
nitrophenoxyacetyl chloride and p-nitrophenoxybutyryl
chloride.

While any acyl halide III can be suitably employed
herein, preferred embodiments employ those compounds
III wherein R is halophenoxy(lower)alkyl or loweralkyl
substituted halophenoxy(lower)alkyl.

The nature of the product obtained from the reaction
of 3-halo-4-hydroxysulfolane with an acyl halide III de-
pends on several variables, such as reaction temperature
and the presence of a predetermined quantity of an acid-
binding agent.

Thus, 3-acyloxy-4-halo-tetrahydrothiophene-1,1-dioxides
I are obtained by carrying out the aforementioned re-
action in the presence of an inert solvent at a temperature
between about 10 and about 150° C. Suitable inert sol-
vents include aromatic solvents such as benzene, toluene,
xylene, etc. The gaseous hydrogen halide by-product is
readily evolved and removed from the reaction mixture
by conventional means where elevated temperatures are
employed.

The compounds 3-acyloxy-4-halo-tetrahydrothiopene-
1,1-dioxides I are also obtained by employing certain
acid-binding agents in the above reaction in a quantity
that is stoichiometric with respect to the acyl halide.
Thus, the use of such materials as triethylamine and
pyridine in the stipulated amounts will provide com-
pounds I while allowing the reaction to be carried out at
lower temperatures within the aforementioned range.
Preferably, inert solvents such as the previously described
aromatics; ketones such as acetone, methyl ethyl ketone,
etc. are employed.

The preparation of 3-acyloxy-2(H)-thiophene-1,1-di-
oxides II is carried out by utilizing one of the aforementioned acid-binding agents in an amount sufficient to bind both the ring halogen and the halogen in the acyl halide. The same temperature ranges and inert solvents are preferably employed in this reaction. Other basic reagents such as sodium acetate, potassium acetate, sodium carbonate, potassium carbonate, etc. can also be suitably employed as acid-binding agents.

Alternately, compounds I may be dehydrohalogenated to provide 3-acyloxy-2(H)-thiophene-1,1-dioxides II by reaction with an acid-binding agent as previously described.

Compounds I and II are readily obtained in high yield and excellent purity and are isolated from the reaction mixture by conventional means such as filtration, crystallization, etc.

The 3-acyloxy-4-halo-tetrahydrothiophene-1,1-dioxides I and 3-acyloxy-2(H)-thiophene-1,1-dioxides II are particularly valuable agricultural chemicals. Thus, they have exhibited strong herbicidal properties. Generally they are mixed with various adjuvants in these applications and low concentrations of the compounds are extremely effective.

For example, the compounds of this invention are excellent aquatic herbicides. Thus, when employed in an aqueous formulation containing 10 p.p.m. of the herbicide, 3-(2-chlorophenoxyacetoxy)-4-chlorotetrahydrothiophene-1,1-dioxide and 3-(2,4-dichlorophenoxyacetoxy)-4-chlorotetrahydrothiophene - 1,1 - dioxide were 100% effective against duckweed.

The compounds I and II of this invention are also valuable post-emergence herbicides. For example, at a rate of application of 20 pounds per acre 3-(4-chloro-o-tolyloxyacetoxy)-4-chlorotetrahydrothiophene-1,1-dioxide,
3-(2-chlorophenoxyacetoxy-4-bromotetrahydrothiophene-1,1-dioxide and
3-(2,4,5-trichlorophenoxyacetoxy)-4-bromotetrahydrothiophene-1,1-dioxide were 100% effective against mustard and pigweed.

The pre-emergence herbicidal effectiveness of compounds I and II is illustrated by the control of crabgrass, mustard and pigweed by 3-(2,4,5-trichlorophenoxyacetoxy)-4-chlorotetrahydrothiophene-1,1-dioxide,
3-(2-chlorophenoxyacetoxy-2(H)-thiophene-1,1-dioxide,
3-(2,4,5-trichlorophenoxyacetoxy-2(H)-thiophene-1,1-dioxide and
3-(4-chloro-o-tolyloxyacetoxy)-2(H)-thiophene-1,1-dioxide at a rate of application of 20 pounds per acre.

The following examples are presented to illustrate the preparation of various 3-acyloxy-4-halo-tetrahydrothiophene-1,1-dioxides I and 3-acyloxy-2(H)-thiophene-1,1-dioxides II in accordance with the practice of this invention.

EXAMPLE 1 o-Chlorophenoxyacetyl chloride (20.5 g., 0.1 mole) was added dropwise to a boiling acetone solution of 3-chloro-4-hydroxysulfolane (16.8 g., 0.1 mole) and triethylamine (10 g., 0.1 mole). After completion of the addition, the reaction mixture was heated at reflux for 6 hours and allowed to cool to room temperature. Then the reaction mixture was poured onto ice, thereby providing a white precipitate which was recrystallized from ethanol to yield 12 g. of a white solid, M.P. 119–21° C. The following analytical data revealed that 3-(2-chlorophenoxyacetoxy)-4-chlorotetrahydrothiophene-1,1-dioxide had been obtained.

*Analysis.*—Calcd. for $C_{12}H_{12}Cl_2O_5S$ (percent): C, 42.39; H, 3.79; Cl, 20.85. Found (percent): C, 42.15; H, 3.58; Cl, 21.05.

EXAMPLE 2

Following the procedure of Example 1, p-chlorophenoxyacetyl chloride (20.5 g., 0.1 mole) was reacted for 20 hours with 3-chloro-4-hydroxysulfolane (16.8 g., 0.1 mole) in the presence of pyridine (7.9 g., 0.1 mole) to provide 10 g. of a white solid, M.P. 105–6° C. The following analytical data revealed that 3-(4-chlorophenoxyacetoxy)-4-chlorotetrahydrothiophene-1,1-dioxide had been obtained.

*Analysis.*—Calcd. for $C_{12}H_{12}Cl_2O_5S$ (percent): C, 42.39; H, 3.79; Cl, 20.85. Found (percent): C, 42.58; H, 3.55; Cl, 20.62.

EXAMPLE 3

Following the procedure of the previous examples, 2,4-dichlorophenoxyacetyl chloride (23.9 g. 0.1 mole) was reacted for 20 hours with 3-chloro-4-hydroxysulfolane (16.8 g., 0.1 mole) in the presence of pyridine (7.9 g., 0.1 mole) to provide 23 g. of a white solid, M.P. 120–22° C. The following analytical data revealed that 3-(2,4-dichlorophenoxyacetoxy) - 4-chlorotetrahydrothiophene-1,1-dioxide had been obtained.

*Analysis.*—Calcd. for $C_{12}H_{11}Cl_3O_5S$ (percent): C, 38.57; H, 2.97; Cl, 28.46. Found (percent): C, 38.82; H, 2.97; Cl, 27.91

EXAMPLE 4

Following the procedure of the previous examples, 2,4,5-trichlorophenoxyacetyl chloride (27.4 g.,) 0.1 mole) was reacted for 6 hours with 3-chloro-4-hydroxysulfolane (16.8 g., 0.1 mole) in the presence of pyridine (7.9 g., 0.1 mole) to provide 12 g. of a white solid, M.P. 155–58° C. The following analytical data revealed that 3-chloro - 4-(2,4,5-trichlorophenoxyacetoxy) - tetrahydrothiophene-1,1-dioxide had been obtained.

*Analysis.*—Calcd. for $C_{12}H_{10}Cl_4O_5S$ (percent): C, 35.23; H, 2.46; Cl, 34.66; S, 7.84. Found (percent): C, 35.44; H, 2.50; Cl, 34.43; S, 7.78.

EXAMPLE 5

Following the procedure of the previous examples, 4-chloro-2 - methylphenoxyacetyl chloride (21.9 g., 0.1 mole) was reacted for 20 hours with 3-chloro-4-hydroxysulfolane (16.8 g., 0.1 mole) in the presence of pyridine (7.9 g., 0.1 mole) to provide 19 g. of a white solid, M.P. 104–6° C. The following analytical data revealed that 3-(4-chloro-o-tolyloxyacetoxy) - 4 - chlorotetrahydrothiophene-1,1-dioxide had been obtained.

*Analysis.*—Calcd. for $C_{13}H_{14}Cl_2O_5S$ (percent): C, 44.20; H, 3.99; Cl, 20.07. Found (percent): C, 44.33; H, 3.95; Cl, 19.94.

EXAMPLE 6

Following the procedure of the previous examples, o-chlorophenoxyacetyl chloride (20.5 g., 0.1 mole) was reacted for 6 hours with 3-bromo-4-hydroxysulfolane (19.7 g., 0.1 mole) in the presence of triethylamine (10 g., 0.1 mole) to provide 10 g. of a white solid, M.P. 142–3° C. The following analytical data revealed that 3-(2-chlorophenoxyacetoxy) - 4 - bromotetrahydrothiophene-1,1-dioxide had been obtained.

*Analysis.*—Calcd. for $C_{12}H_{12}BrClO_5S$ (percent): C, 37.39; H, 3.35; Cl, 9.19. Found (percent): C, 37.64; H, 3.48; Cl, 9.01.

EXAMPLE 7

Following the procedure of the previous examples, 2,4,5-trichlorophenoxyacetyl chloride (27.4 g., 0.1 mole) was reacted for 20 hours with 3-bromo-4-hydroxysulfolane (19.7 g., 0.1 mole) in the presence of pyridine (7.9 g., 0.1 mole) to provide 23 g. of a white solid, M.P. 85–7° C. The following analytical data revealed that 3-(2,4,5-trichlorophenoxyacetoxy) - 4 - bromotetrahydrothiophene-1,1-dioxide had been obtained.

*Analysis.*—Calcd. for $C_{12}H_{10}BrCl_3O_5S$ (percent): C, 31.85; H, 2.23; Cl, 23.50. Found (percent): C, 31.63; H, 2.26; Cl, 23.18.

EXAMPLE 8

Following the procedure of the previous examples, 4-chloro-2 - methylphenoxyacetyl chloride (21.9 g., 0.1 mole) was reacted for 6 hours with 3-bromo-4-hydroxysulfolane (19.7 g., 0.1 mole) in the presence of pyridine (7.9 g., 0.1 mole) to provide 7 g. of 3-(4-chloro-o-tolyloxyacetoxy) - 4 - bromotetrahydrothiophene-1,1-dioxide, M.P. 86–8° C.

EXAMPLE 9

Following the procedure of the previous examples, o-chlorophenoxyacetyl chloride (20.5 g., 0.1 mole) was reacted for 19 hours with 3-bromo-4-hydroxysulfolane (19.7 g., 0.1 mole) in the presence of triethylamine (20.2 g., 0.2 mole) to provide 15 g. of a white solid, M.P. 142–4° C. The following analytical data revealed that 3-(2-chlorophenoxyacetoxy) - 2(H)-thiophene-1,1-dioxide had been obtained.

*Analysis.*—Calcd. for $C_{12}H_{11}ClO_5S$ (percent): C, 47.61; H, 3.66; Cl, 11.71. Found (percent): C, 47.27; H, 3.49; Cl, 11.88.

EXAMPLE 10

Following the procedure of the previous examples, 4-chlorophenoxyacetyl chloride (20.5 g., 0.1 mole) was reacted for 20 hours with 3 - bromo-4-hydroxysulfolane (19.7 g., 0.1 mole) in the presence of triethylamine (20.2 g., 0.2 mole) to provide 18 g. of a white solid, M.P. 141–3° C. The following analytical data revealed that 3-(4-chlorophenoxyacetoxy) - 2(H)-thiophene - 1,1-dioxide had been obtained.

*Analysis.*—Calcd. for $C_{12}H_{11}ClO_5S$ (percent): C, 47.61; H, 3.66; Cl, 11.71. Found (percent): C, 47.85; H, 3.63; Cl, 11.92.

EXAMPLE 11

Following the procedure of the previous examples, 2,4-dichlorophenoxyacetyl chloride (23.9 g., 0.1 mole) was reacted for 19 hours with 3-bromo-4-hydroxysulfolane (19.7 g., 0.1 mole) in the presence of triethylamine (20.2 g., 0.2 mole) to provide 20 g. of a white solid, M.P. 165–7° C. The following analytical data revealed that 3-(2,4 - dichlorophenoxyacetoxy) - 2(H)-thiophene-1,1-dioxide had been obtained.

*Analysis.*—Calcd. for $C_{12}H_{10}Cl_2O_5S$ (percent): C, 42.75; H, 2.99; Cl, 21.03. Found (percent): C, 42.58; H, 2.80; Cl, 21.14.

EXAMPLE 12

Following the procedure of the previous examples, 2,4,5-trichlorophenoxyacetyl chloride (27.4 g., 0.1 mole) was reacted for 20 hours with 3-bromo-4-hydroxysulfolane (19.7 g., 0.1 mole) in the presence of triethylamine (20.2 g., 0.2 mole) to provide 7 g. of a white solid, M.P. 168–70° C. The following analytical data revealed that 3-(2,4,5-trichlorophenoxyacetoxy) - 2(H)-thiophene-1,1-dioxide had been obtained.

*Analysis.*—Calcd. for $C_{12}H_9Cl_3O_5S$ (percent): C, 38.78; H, 2.44; Cl, 28.61. Found (percent) C, 39.11; H, 2.32; Cl, 27.92, 27.77.

EXAMPLE 13

Following the procedure of the previous examples, 4-chloro-2-methylphenoxyacetyl chloride (21.9 g., 0.1 mole) was reacted for 4 hours with 3-bromo-4-hydroxysulfolane (19.7 g., 0.1 mole) in the presence of triethylamine (20.2 g., 0.2 mole) to provide 13 g. of a white solid, M.P. 99–101° C. The following analytical data revealed that 3-(4-chloro-o-tolyloxyacetoxy) - 2(H)-thiophene-1,1-dioxide had been obtained.

*Analysis.*—Calcd. for $C_{13}H_{13}ClO_5S$ (percent): C, 49.32; H, 4.08; Cl, 11.20. Found (percent) C, 49.53; H, 4.14; Cl, 11.20.

What is claimed is:

1. A compound selected from the group consisting of
   (a) 3-acyloxy-4-halo-tetrahydrothiophene-1,1 - dioxides having the formula

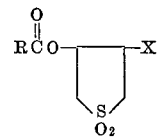

and (b) 3-acyloxy-2(H)-thiophene-1,1-dioxides having the formula

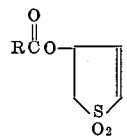

wherein X is halogen and R is phenoxy(lower)alkyl, halophenoxy(lower)alkyl, loweralkyl substituted phenoxy(lower)alkyl, loweralkyl substituted halophenoxy(lower)alkyl or nitrophenoxy(lower)alkyl.

2. The 3-acyloxy-4-halo-tetrahydrothiophene - 1,1 - dioxide of claim 1 wherein X is halogen and R is halophenoxy(lower)alkyl or loweralkyl substituted halophenoxy(lower)alkyl.

3. The 3-acyloxy-4-halo-tetrahydrothiophene - 1,1 - dioxide of claim 2 having the name 3-(2,4,5-trichlorophenoxyacetoxy) - 4 - bromotetrahydrothiophene - 1,1-dioxide.

4. The 3-acyloxy-4-halo-tetrahydrothiophene - 1,1-dioxide of claim 2 having the name 3-(2-chlorophenoxyacetoxy)-4-bromo-tetrahydrothiophene-1,1-dioxide.

5. The 3-acyloxy-4-halo-tetrahydrothiophene - 1,1 - dioxide of claim 2 having the name 3-(4-chloro-o-tolyloxyacetoxy)-4-chlorotetrahydrothiophene-1,1-dioxide.

6. The 3-acyloxy-2(H)-thiophene-1,1-dioxide of claim 1 wherein X is halogen and R is halophenoxy(lower)alkyl or loweralkyl substituted halophenoxy(lower)alkyl.

7. The 3-acyloxy-2(H)-thiophene-1,1-dioxide of claim 6 having the name 3(2-chlorophenoxyacetoxy) - 2(H)-thiophene-1,1-dioxide.

8. The 3-acyloxy-2(H)-thiophene-1,1-dioxide of claim 6 having the name 3-(2,4-dichlorophenoxyacetoxy)-2(H)-thiophene-1,1-dioxide.

9. The 3-acyloxy-2(H)-thiophene-1,1-dioxide of claim 6 having the name 3-(4-chloro-o-tolyloxyacetoxy)-2-(H)-thiophene-1,1-dioxide.

References Cited

UNITED STATES PATENTS 2,460,233   1/1949   Morris et al. _____ 260—329

HENRY R. JILES, Primary Examiner

C. M. SHURKO, Assistant Examiner

U.S. Cl. X.R.

260—544; 71—66, 91